July 9, 1940.  F. L. McGARY  2,207,222
SHEARS
Filed Aug. 30, 1937
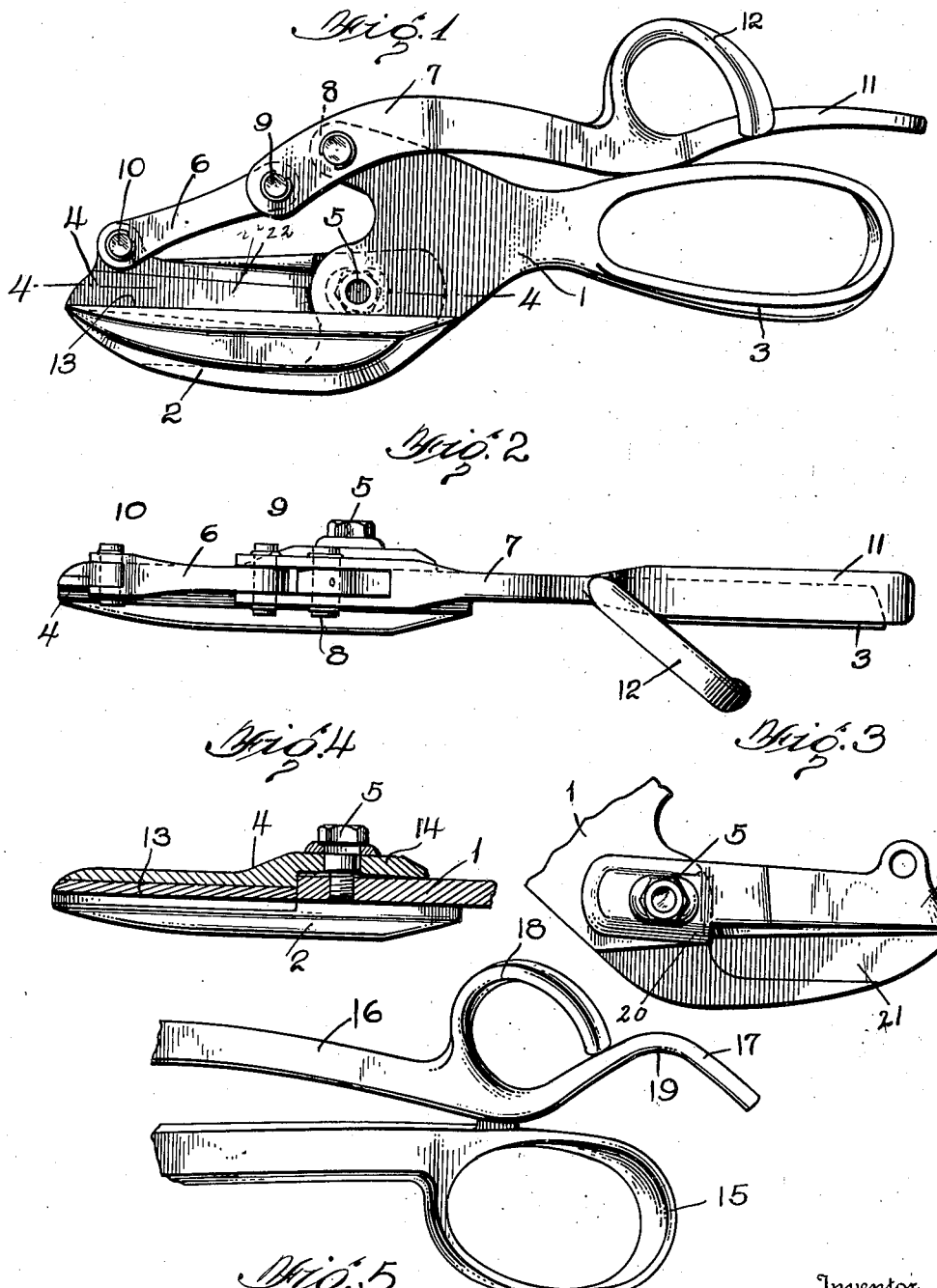
Inventor
Francis L. McGary
By Dahm + Taylor
Attorneys Patented July 9, 1940

2,207,222

UNITED STATES PATENT OFFICE 2,207,222

SHEARS

Francis L. McGary, Hardinsburg, Ky.

Application August 30, 1937, Serial No. 161,670

3 Claims. (Cl. 30—341)

This invention relates to shears for cutting sheet metal such as hoops, straps for binding boxes and packages and similar sheet metal articles.

The object of the invention is to provide a device for cutting sheet metal comprising a pair of cutting blades or jaws operated through a toggle mechanism, and also to provide means for adjusting the blades relative to each other when they become loose due to excessive wear.

A further object of the invention is to provide a novel hand-hold or handle which is easily grasped in the hand and provides a more effective leverage for operating one of the blades of the shears than those heretofore designed for this purpose.

With respect to the handle, the invention provides an open loop whereby the handles of the shears may be opened by upward pressure of the thumb of the operator on the open loop and also a longer and more effective leverage in closing the shears by reason of the extended operating surface on the handle controlled by the thumb of the operator.

Referring to the drawing:

Figure 1 is a view in elevation of a pair of shears constructed in accordance with this invention shown in the normal position for operation.

Figure 2 is a plan view of the shears shown in Figure 1.

Figure 3 is a fragmentary view of the shears of Figures 1 and 2, showing the arrangement of the cutting blade with respect to its mounting on the stationary blade of the shears.

Figure 4 is a section on the line 4—4 of Figure 1, and

Figure 5 is a view in elevation showing a pair of shear handles similar to those shown in Figures 1 and 2, but slightly modified.

Referring to Figure 1 of the drawing, the element 1 comprises a cutting jaw 2 and a handle portion 3 comprising a closed loop for the insertion of the fingers of the hand of the operator. The cutting jaw 4 is pivoted at 5 to the member 1 and is operated through a toggle mechanism comprising a link 6, a bifurcated member 7 pivoted on the extension 8 of the member 1 and having its outer end pivoted at 9 to the link 6, which link is pivoted at 10 to the outer end of the cutting jaw 4. The member 7 forming a part of the operating handle for the cutting jaw 4 has an extension 11 extending above and substantially beyond the end of the loop 3. This extension 11 forms the operating surface for the thumb of the operator when using the shears with the fingers of the hands extended through the loop 3 in the customary manner of devices of this kind.

For the purpose of separating the handle members 1 and 7, the member 7 is provided with a curved member 12 which constitutes an open loop with the extension 11 and is so positioned that when the tool is grasped properly for operation it lies above the thumb, and when the hand is open the thumb presses against the lower surface of the member 12 to lift the handle 11, and through the toggle mechanism separates the jaws 2 and 4.

As shown in Figure 1, and more clearly in Figure 2, the open loop 12 is bent out of the plane of the two extensions of the handle members so that the loop will not interfere with the exertion of the full force of the hand when the handle members are forced into closing or cutting position.

It will also appear from Figure 1 that the curvature of the loop 12 is such that the loop will lie immediately above the thumb when the hand is in operating position and will serve to lift the extension 11 when the hand is opened to open the cutting jaws of the shears. The provision of an open loop of the character described comprising the two members 11 and 12 provides a handle member giving a longer leverage and a more effective use of the strength of the hand in devices of this character than has heretofore been possible where the thumb loop was closed. In grasping the tool for normal operation the fingers are extended through the loop 3 and the thumb under the element 12, with the forearm practically in line with the handle members 1 and 7. The open loop does not interfere with the exertion of the full strength of the operator in the cutting movement of the shears and also provides a ready means for opening the shears without any change of position of the hand. In operation of the device the pressure of the handles is exerted nearer the pivot point of the jaws during the first stages of operation and as the cutting proceeds the leverage is extended by reason of the closing of the thumb and fingers of the hand of the operator and the shifting of the point of application of force to the right in Figure 1 as the heel of the thumb approaches the fingers in forcing the handles together.

Another feature of importance is the arrangement of the cutting jaws at the pivot point 5 to compensate for wear. As shown in Figures 1, 2 and 4, the cutting jaw 2 is offset from the handle member 1 and the face of the jaw 2 is parallel to the upper face of the member 1 as shown in Figure 4. The cutting jaw 4 is provided with an inserted cutting face or edge 13 and is also provided with an offset extension 14 extending in Figure 4 a substantial distance to the right at the pivot 5 to form a fulcrum when in contact with a member 1 for adjusting the two cutting edges to compensate for wear. In Figure 4 it can be seen that the offset of extension 14 to the left of the pivot 5 is spaced from the member 1 so that when the blades become worn the pivot screw at 5 can be tightened to draw the cutting edges of the jaws closer together by the fulcrum action of the extension 14 in engagement with the handle member 1.

Referring to Figure 5, this figure shows a pair of handles similar to those shown in Figure 1, the lower handle comprising a closed loop 15 for insertion of the fingers of the operator and the upper handle 16 having an extension 17 and a curved open loop 18 which is substantially of the same construction as the loop 12 of Figures 1 and 2. The construction of Figure 5 is substantially the same as that in Fig. 1 except that the extension 17 is curved substantially as shown at 19 in order to conform somewhat more closely to the shape of the hand in forcing the cutting jaws into closed position with the cutting operation. The loop 18 serves effectively to open the handle in the same manner as the corresponding elements in Figures 1 and 2.

A shoulder 20 (Fig. 3) may be used with either form of the invention, this shoulder being provided on the jaw 4. It will be understood that the actual cutting means consists of hardened blades secured to the jaws, as shown at 21, 22 in Figs. 1 and 3 respectively. These blades are so shaped that they do not separate entirely in the fully opened position of the jaws; i. e., they still overlap somewhat at their inner ends nearest the pivot 5. But after long use the blades 21, 22 wear down so that they separate over their whole length when the shear is opened and permit the work; e. g., a sheet of tin or other sheet metal, to pass between them and strike against the main frame which, in this case, is the portion of element 1 just ahead of the pivot 5. In such case the shears will pinch a portion of the sheet metal between jaw 4 and the main frame instead of making a clean cut. Now by providing a shoulder at 20 on the jaw 4, which shoulder extends forward into line with the vertical rear end of the blade 22 and downward far enough so that its lower corner is always below the cutting edge of blade 21, this shoulder 20 will arrest the sheet which is to be cut and will not permit the end of said sheet to pass back beyond the cutting edges of the blades, thus eliminating any possibility of pinching on that account.

It will be obvious to those skilled in the art that many alterations in the devices shown in the drawing and described in the specification may be made, all without departing from the spirit of my invention, and therefore I do not limit myself to what is thus shown and described, but only as required by the state of the prior art.

Having thus fully described my invention, what I claim is:

1. A pair of shears comprising a pair of jaws, handles therefor including a handle having a grip for the fingers, a handle for the thumb, and a curved thumb lift on the latter handle providing an open loop for the thumb, said thumb lift extending upward and laterally from said handle and being widely spaced at its end from said handle.

2. In shears for cutting sheet metal, a pair of jaws, a pivot connecting said jaws, a hardened blade on each jaw terminating short of said pivot, means to prevent said jaws from separating normally so far as to separate said blades fully, and a shoulder on one of said jaws located forwardly of the rear ends of said blades and beyond the line of cut of said blades to prevent pinching of the work behind said blades after the blades have worn down.

3. Metal cutting shears comprising a pair of jaws, handles therefor including a handle having a grip for the fingers, a handle for the thumb extending parallel to and beyond the grip for the fingers, and a thumb lift on said last-named handle, said thumb lift being curved upward and then downward approximately to the plane of the rear portion of its handle and extending laterally away from the handle sufficiently to permit the user's thumb to lie alongside its handle.

FRANCIS L. McGARY